United States Patent

Honmou

[11] Patent Number: 6,161,965
[45] Date of Patent: Dec. 19, 2000

[54] OPTICAL COUPLING CIRCUIT

[75] Inventor: Hiroshi Honmou, Tokyo, Japan

[73] Assignee: NEC Corporation, Japan

[21] Appl. No.: 09/078,244

[22] Filed: May 13, 1998

[30] Foreign Application Priority Data

May 16, 1997 [JP] Japan .................................. 9-126687

[51] Int. Cl.[7] .................................................. G02B 6/36
[52] U.S. Cl. ............................................. 385/94; 385/88
[58] Field of Search .......................................... 385/88–94

[56] References Cited

U.S. PATENT DOCUMENTS

| | | | |
|---|---|---|---|
| 4,591,711 | 5/1986 | Taumberger | 250/227 |
| 4,756,590 | 7/1988 | Forrest et al. | 385/88 |
| 4,941,724 | 7/1990 | Couden et al. | 385/88 X |
| 4,946,238 | 8/1990 | Sashin et al. | 385/76 |
| 5,005,939 | 4/1991 | Arvanitakis et al. | 385/76 |
| 5,066,097 | 11/1991 | Brandle et al. | 385/76 |
| 5,068,865 | 11/1991 | Ohshima | 372/36 |
| 5,101,465 | 3/1992 | Murphy | 385/88 |
| 5,247,596 | 9/1993 | Maignan et al. | 385/88 |
| 5,446,814 | 8/1995 | Kuo et al. | 385/31 |
| 5,692,084 | 11/1997 | Roff | 385/88 |

FOREIGN PATENT DOCUMENTS

| | | |
|---|---|---|
| 61-73108 | 5/1986 | Japan . |
| 63-218909 | 9/1988 | Japan . |
| 1120112 | 5/1989 | Japan . |
| 258007 | 2/1990 | Japan . |
| 4309908 | 11/1992 | Japan . |
| 553033 | 3/1993 | Japan . |
| 9138325 | 5/1997 | Japan . |

*Primary Examiner*—Phan T. H. Palmer
*Attorney, Agent, or Firm*—Ostrolenk, Faber, Gerb & Soffen

[57] ABSTRACT

A low-cost optical coupling circuit that enables high-efficiency coupling between an optical transmission line 4 and a photodetector element 2 is provided with an optical transmission line 4 and a photodetector element 2, both located on a substrate 1. The substrate 1 propagates light and receives emitted light L2 from the optical transmission line 4. A filler material 8 having a refractive index that is either equivalent to or lower than the refractive index of the core of the optical transmission line 4 fills the space between the optical transmission line 4 and photodetector element 2.

10 Claims, 1 Drawing Sheet

OPTICAL COUPLING CIRCUIT

BACKGROUND OF THE INVENTION

1. Field of the Invention

The present invention relates to an optical coupling circuit for optical communication that allows the light emitted from an optical transmission line such as an optical fiber to be received by a photodetector element, and in particular to an optical coupling circuit that enables both highly efficient coupling as well as low cost.

2. Description of the Related Art

An optical coupling circuit for optical communication that allows the output light of an optical transmission line such as an optical fiber to be received at a photodetector element is a key component in the configuration of an optical communication system.

In the interest of reducing the costs of optical communication devices, there has been a growing demand in recent years for optical coupling circuits that feature easy assembly and efficient optical incidence.

As one example of an optical coupling circuit that can meet this demand, an optical coupling circuit has been proposed that raises the efficiency of light incidence to a photodetector element by forming a lens at the emission end surface of an optical fiber so as to reduce the spread of light emitted from the optical fiber and thereby allow the photodetector element to efficiently receive light emitted from the optical fiber.

Nevertheless, this example of the prior art has several drawbacks. First, due to the extremely small outer diameter of approximately 125 μm of an optical fiber as well as the small diameter of approximately 50 μm of the lens, the fabrication process for forming the lens on the end surface of the optical fiber is complex and entails numerous fabrication steps.

In addition, the high-precision processing techniques that are required in forming such lenses on the emission end surfaces of optical fibers results in poor product yield of the fabrication process.

Finally, there is the problem that the small dimensions of the lens necessitate sophisticated inspection equipment for monitoring the products. These problems all contribute to the difficulty of reducing the cost of an optical coupling circuit.

SUMMARY OF THE INVENTION

The present invention was developed as a solution to these problems and has the object of providing an optical coupling circuit that enables highly efficient coupling between an optical transmission line and a photodetector element, and moreover, that can be produced at a lower cost.

The optical coupling circuit of the present invention is provided with an optical transmission line on a substrate that propagates light, and a photodetector element on the substrate that receives light emitted from the optical transmission line; wherein the space between the optical transmission line and the photodetector element is filled with a material having a refractive index that is approximately equal to or lower than the refractive index of the core of the optical transmission line.

In addition, a mirror may be provided between the optical transmission line and the photodetector element that reflects light emitted from the optical transmission line and causes the emitted light to be received by the photodetector element. This mirror may be a mirror surface formed on either the end surface of the optical transmission line or the substrate.

The optical transmission line of this optical coupling circuit may be either an optical fiber or an optical waveguide, and the photodetector element may be either a photodiode or an avalanche photodiode.

The material that fills the space between the optical transmission line and the photodetector element of this optical coupling circuit is preferably a silicone resin.

The light emitted from an optical transmission line such as an optical fiber is emitted and spreads at an angle determined by the relative refractive index difference Δ of the optical transmission line (the ratio of the differences in refractive index of the core and cladding) and the refractive index of the medium. As a result, the angle of emission of the emitted light can be varied by changing the refractive index of the medium.

In the optical coupling circuit of the present invention, the angle of emission of light emitted from the optical transmission line can be reduced and the spread of emitted light can be reduced by filling the space between the optical transmission line and the photodetector element with a material having a refractive index that is less than or equal to the refractive index of the core of the optical transmission line. In this way, light emitted from the optical transmission line can be directed to the photodetector element with high efficiency.

Because a lens is not employed as in the prior art, this invention allows a simplification in construction, an improvement in the yield of the manufacturing process, and an improvement in the reliability of the products. The invention further allows simplification of the production equipment, which therefore reduces the manufacturing costs. As a result, the invention provides a less expensive optical coupling circuit.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 1:
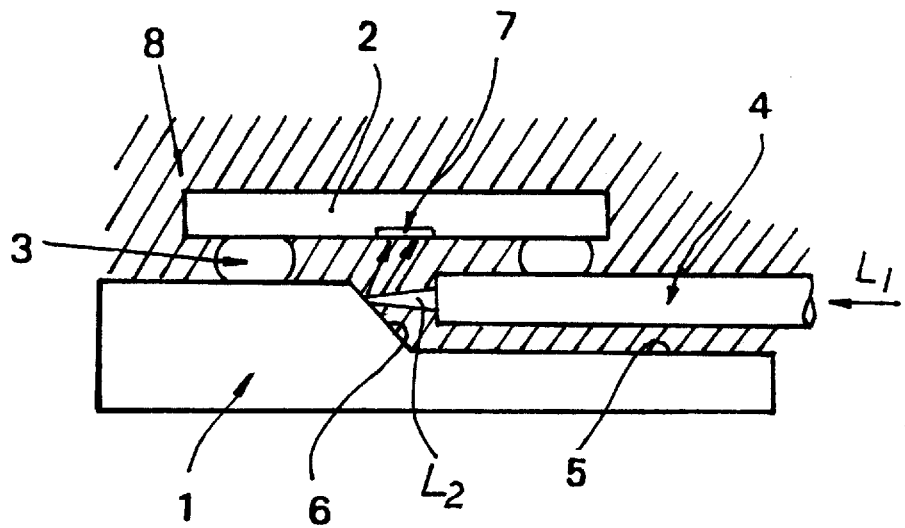
FIG. 1 is a sectional view showing an optical coupling circuit according to one embodiment of the present invention.

A detailed explanation of an embodiment of the present invention is presented below with reference to the figures. FIG. 1 is a sectional view showing an embodiment of the optical coupling circuit of the present invention.

In this figure, surface-reflecting photodiode 2 (hereinbelow abbreviated "PD element") is joined to silicon substrate 1 by means of bumps 3, and optical fiber 4 is accommodated in V-groove 5 having a flat end surface formed on silicon substrate 1.

Mirror surface 6 is formed on silicon substrate 1 to reflect emitted light L2 from optical fiber 4 and to direct the reflected light to light-receiving surface 7 of PD element 2. The optical path between PD element 2 and optical fiber 4 is filled with filler material 8 having a refractive index of the same level as that of optical fiber 4. Filler material 8 is preferably a silicone resin having a refractive index that is approximately equal to or lower than the refractive index of the core of optical fiber 4.

As one modification of this embodiment, PD element 2 has a surface of incidence with a light-receiving diameter of 80 μm, and optical fiber 4 is a multimode optical fiber having an outer diameter of 125 μm and a core diameter of 62.5 μm. In addition, the distance between PD element 2 and optical fiber 4 is approximately 155 μm, and the refractive index of the silicone resin used as filler material 8 is equivalent to the refractive index of the core of optical fiber 4 at 1.47. Further, bumps 3 are of AuSn (gold-tin) solder and have a height of 50 μm.

Regarding the operation of this optical coupling circuit, light L1 propagated within optical fiber 4 is emitted from the emission end surface of optical fiber 4, and this emitted light L2 is reflected by mirror surface 6 and directed into light-receiving surface 7 of PD element 2. Because the refractive index (n=1.47) of the core of optical fiber 4 is equivalent to the refractive index (n=1.47) of filler material 8, emitted light L2 that is emitted from optical fiber 4 is emitted at a small angle that is determined by the relative refractive index difference Δ (approximately 0.2%). As a result, nearly all of emitted light L2 is received at light-receiving surface 7, as is the case in the prior art discussed above in which the emitted light passes through a lens.

Figure 2:
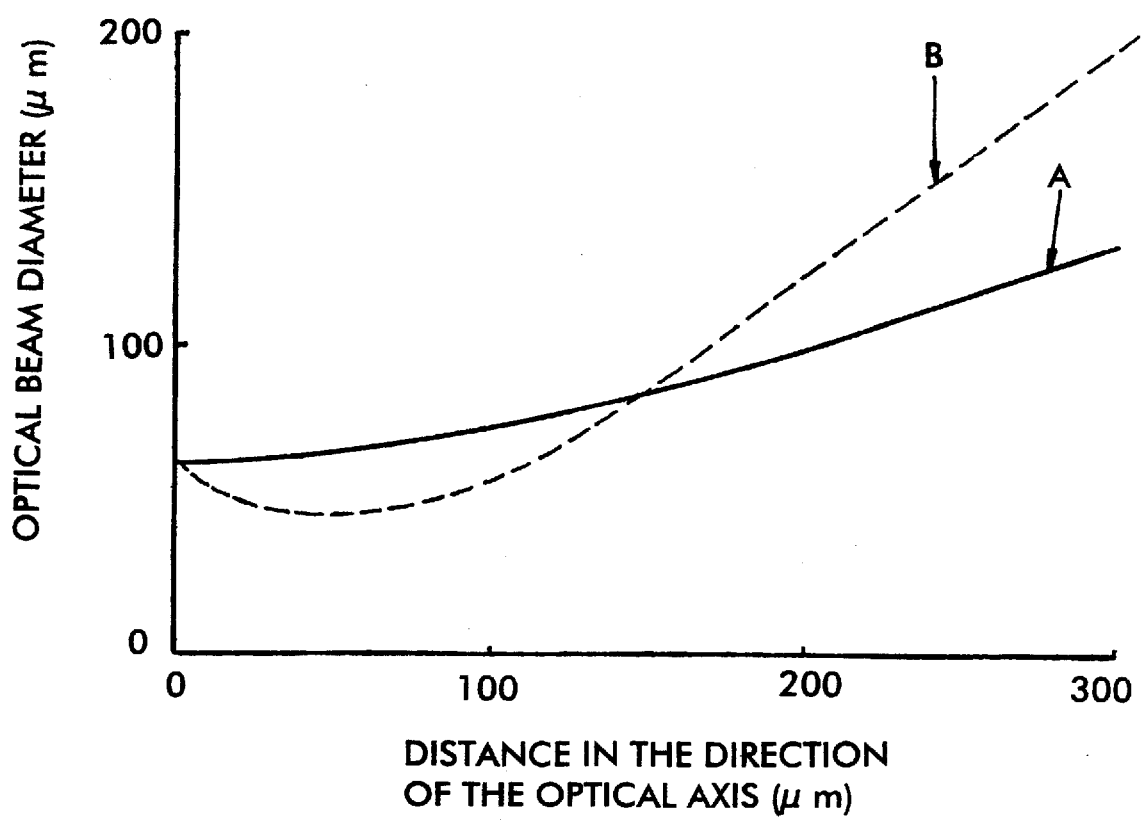
FIG. 2 is a graph showing the relationship between the optical beam diameter of emitted light and the distance from the emission surface in the direction of the optical axis.

FIG. 2 is a graph showing the relationship between the diameter of a beam of emitted light and the distance from the emission surface in the direction of the optical axis. Line A (solid line) plots the relationship between the distance in the direction of the optical axis and the diameter of the light beam within a silicone resin for light emitted from optical fiber 4 having a flat end surface according to this embodiment. Line B (dotted line) plots the relationship between the distance in the direction of the optical axis and the diameter of the light beam in an empty space for light emitted from an optical fiber in which a lens is formed according to the prior art.

At a distance from the emission surface of approximately 155 μm in the direction of the optical axis, the 80-μm diameter of the light beam of optical fiber 4 in this embodiment is equivalent to the diameter of a light beam in the prior-art case. As a result, nearly all of emitted light L2 is received at a light-receiving surface 7 which has an 80 μm μm diameter, as is the case in the prior art in which the light passes through a lens. Thus highly efficient coupling is therefore possible.

In the optical coupling circuit of the present invention according to the foregoing explanation, a material having a refractive index that is equivalent to or less than the refractive index of the core of the optical transmission line fills the space between the optical transmission line and the photodetector element, thereby enabling a reduction of the angle of emission of light emitted from the optical transmission line and a reduction of the spread of the emitted light. Accordingly, light emitted from the optical transmission line can be highly efficiently directed into the photodetector element.

In addition, the omission of the lens used in the prior art enables simplification of the construction, improvement in the yield of the fabrication process, as well as improvement in the reliability of the products. The present invention therefore enables simplification of the manufacturing equipment, a reduction of in manufacturing costs, and the realization of a less expensive optical coupling circuit.

The present invention employs a filler material having a refractive index that is either equivalent to or lower than the refractive index of the optical fiber, and the amount of light reflected from the light emission end surface of the optical fiber is therefore small. The invention therefore has the advantage of reducing noise brought about by reflected light.

Although an optical fiber is employed as the optical transmission line in the optical coupling circuit of this embodiment, the present invention is not limited to the use of optical fibers and may alternatively employ, for example, a silica glass optical waveguide, a polyimide optical waveguide, or a plastic optical waveguide. In addition, the present invention is not limited to the use of the multimode optical fiber used as the optical fiber in this embodiment, and may alternatively use, for example, a single-mode optical fiber.

In addition, the present invention is not limited to the use of a surface-incident PD element that is provided as the photodetector element in this embodiment, and may alternatively use, for example, a reverse-surface incident PD element or an avalanche photodiode (APD element).

Finally, although the photodetector element is joined to the silicon substrate by means of bumps in this embodiment, it may also be joined by means of a flat solder layer. The mirror surface formed on the silicon substrate in this embodiment may also be formed on the end surface of the optical fiber, and a construction may be adopted in which light emitted from the optical transmission line is directly incident to the photodetector element without reflecting off of a mirror.

It is to be understood that although the characteristics and advantages of the present invention have been set forth in the foregoing description, the disclosure is illustrative only, and changes may be made in the arrangement of the parts within the scope of the appended claims.

What is claimed is:

1. An optical coupling circuit comprising:
    a substrate;
    an optical transmission line provided on said substrate that propagates light; and
    a photodetector element provided on said substrate that receives light emitted from said optical transmission line;
    wherein at least a portion of an optical path of said emitted light between said optical transmission line and said photodetector element is filled by a filler material having a refractive index that is approximately equal to or lower than the refractive index of a core of said optical transmission line to minimize spreading of the emitted light from said optical transmission line such that substantially all of the light is received by the photodetector.

2. An optical coupling circuit according to claim 1, wherein a mirror is provided between said optical transmission line and said photodetector element for reflecting light emitted from said optical transmission line and causing said light to be received by said photodetector element.

3. An optical coupling circuit according to claim 2, wherein said mirror is a mirror surface formed either on the end surface of said optical transmission line or on said substrate.

4. An optical coupling circuit according to claim 1, wherein said optical transmission line is optical fiber.

5. An optical coupling circuit according to claim 4, wherein the optical fiber is a multimode optical fiber.

6. An optical coupling circuit according to claim 4, wherein the optical fiber is a single-mode optical fiber.

7. An optical coupling circuit according to claim 1, wherein said filler material is a silicone resin.

8. An optical coupling circuit according to claim 1, wherein the relative refractive index difference between the refractive index of the core of the optical transmission line and the refractive index of the filler material is approximately 0.2%.

9. An optical coupling circuit according to claim 1, wherein said optical transmission line is an optical waveguide.

10. An optical coupling circuit according to claim 1, wherein said photodetector element is either a photodiode or an avalanche photodiode.

\* \* \* \* \*